July 6, 1937.　　　　　S. BLICKMAN　　　　　2,086,115
MEASURING DEVICE
Filed Dec. 13, 1935
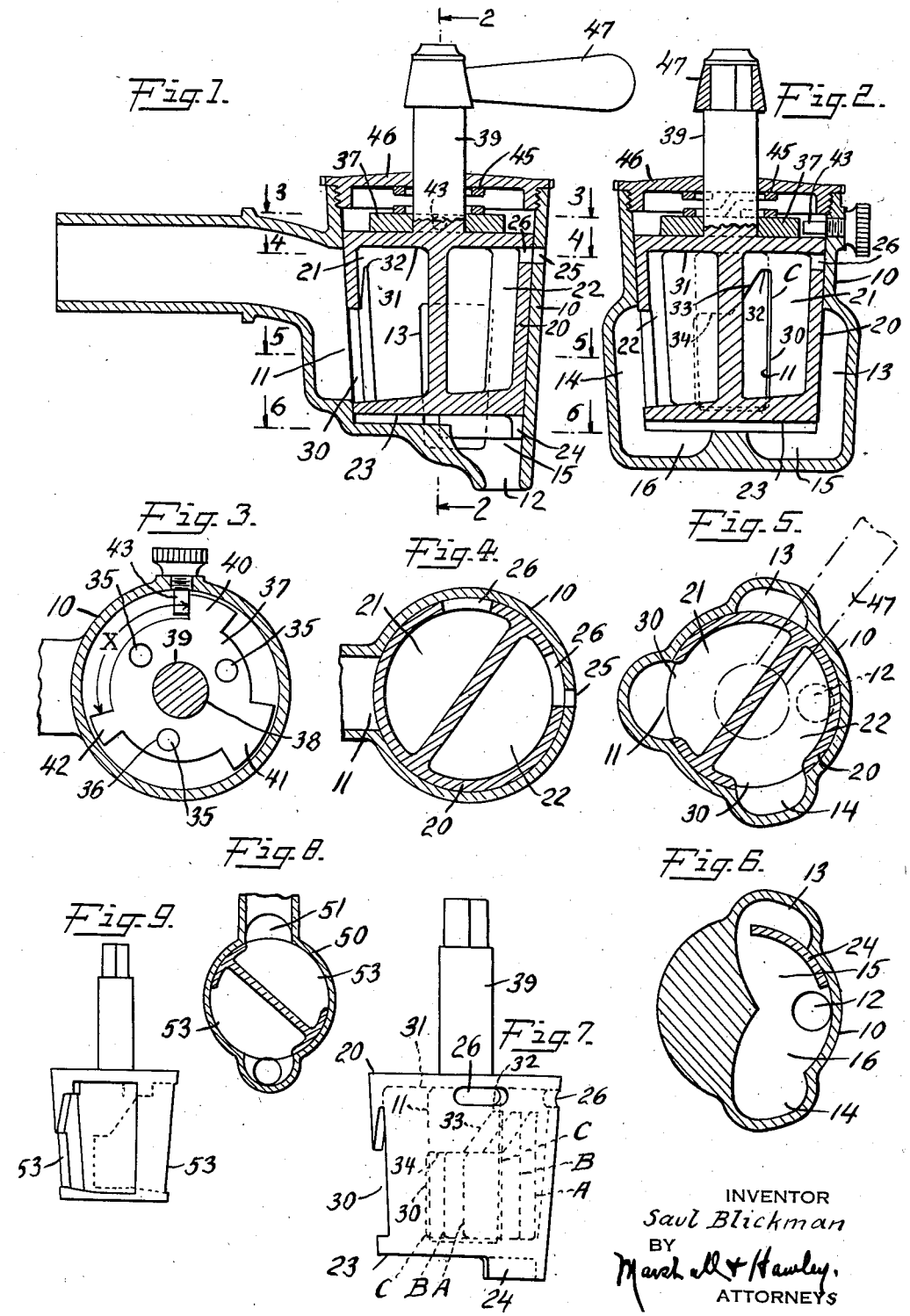
INVENTOR
Saul Blickman
BY
Marshall & Hawley.
ATTORNEYS Patented July 6, 1937

2,086,115

UNITED STATES PATENT OFFICE 2,086,115

MEASURING DEVICE

Saul Blickman, New York, N. Y.

Application December 13, 1935, Serial No. 54,198

10 Claims. (Cl. 221—107)

This invention relates to measuring devices for measuring and dispensing liquids.

More specifically stated, the invention relates to a measuring device, such as a faucet similar to those used in restaurants, soda fountains or any like establishments for dispensing measured quantities of liquids or beverages. Faucets of this type are now on the market, but the devices now in common use have only a single measuring and dispensing chamber so that it is necessary to turn the faucet to filling position, wait for the chamber to fill, and then turn the faucet to discharge position. This operation obviously is time consuming and materially retards the rate of dispensing of liquids since the chamber must be filled after each discharge and during the filling operation the faucet is idle and cannot dispense liquid.

This invention has for its salient object to provide a measuring device or faucet having a plurality of chambers so arranged that one chamber can be discharged while another chamber is being filled.

Another object of the invention is to provide in a device of the type specified, simple and practical means for varying the capacities of the measuring chambers.

Another object of the invention is to provide a device of the character described so constructed and arranged that a relatively small angle of rotation is necessary to change from filling to discharge position and vice versa.

Another object of the invention is to provide a measuring device of the character specified that is simple and practical in construction, comprises few parts and can be easily and quickly assembled or taken apart for cleaning.

Further objects of the invention will appear from the following specification taken in connection with the drawing which forms a part of this application, and in which Fig. 1 is a sectional elevation of a measuring device or faucet constructed in accordance with the invention;

Fig. 2 is a sectional elevation of the device shown in Fig. 1 taken at right angles to Fig. 1 and substantially on line 2—2 of Fig. 1;

Figs. 3, 4, 5 and 6 are horizontal sectional elevations taken substantially on lines 3—3, 4—4, 5—5 and 6—6 of Fig. 1;

Fig. 7 is an elevational view of the valve and the inlet port of the housing showing different positions of the valve obtained by different adjustments of the stop devices which limit the rotation of the valve;

Fig. 8 is a sectional elevation similar to Fig. 5 but showing a slightly modified form of valve and housing; and Fig. 9 is an elevational view of the valve shown in Fig. 8.

The invention briefly described consists of a measuring device or, in the embodiment of the invention illustrated, a measuring faucet comprising a housing having an inlet port and an outlet port and a valve rotatably mounted in the housing and having a plurality, such as a pair of chambers therein. Each chamber has an opening through which the chamber is filled and discharged, the opening being arranged to communicate in different positions of the valve adjustment with the inlet port and the outlet port of said housing. The chambers and the openings therein are so angularly spaced that when one chamber communicates with the inlet port the other chamber communicates with the outlet port of the housing. Furthermore, the openings into the chambers are so formed that in conjunction with adjustable stops which limit the rotation of the valve the portion of the opening communicating with the inlet port will be varied. Also the upper edge of the opening in each chamber is disposed below the top of the chamber so that air will be trapped above the liquid. By varying the portion of the chamber opening exposed to the inlet port the amount of air trapped can be varied, thus providing for different capacities or quantities of liquid in the chamber.

Further details of the invention will appear from the following description.

In the particular embodiment of the invention illustrated in the drawing, the measuring device comprises a housing or casing 10 having an inlet port 11 and an outlet port 12. In the form of the invention shown in Figs. 1–7, inclusive, the housing has formed therein a pair of pockets 13 and 14 which communicate with the outlet port 12 through conduits or recessed portions in the bottom of the housing shown at 15 and 16 and thus conduct the liquid from the valve chambers to the outlet port 12. It will be noted from the showing in Fig. 5 that the pockets 13 and 14 are equally angularly spaced from the inlet port 11 and are disposed on opposite sides thereof.

The valve, preferably of the conical type, comprises a casing 20 in which are formed two chambers 21 and 22, each chamber occupying substantially one-half of the capacity of the valve casing. The bottom wall 23 of the valve has formed thereon a downwardly extending rib 24 shown in section in Fig. 6, this rib being disposed in the recess or cut away portion in the bottom of the housing, which forms the conduits 15 and 16. When the valve is assembled in the housing it must be turned to such a position that the rib 24 will extend downwardly into the recess and thus the correct positioning or assembling of the valve in the housing is insured.

The housing is provided with a vent opening 25 opposite the inlet port 11 and each chamber is provided with a vent port or opening 26 adapted to register with the opening 25 when the chamber is disposed in discharge position.

Each of the chambers 21 and 22 has an opening 30 through which the chamber is filled and discharged and it should be noted that the inner surface 31 of the upper wall of each chamber is disposed above the extreme upper edge 32 of the opening 30, so that air will be trapped in the top of the chamber above the edge 32. Each opening 30 is also formed with an inclined wall or edge 33 and a substantially horizontal edge 34.

Means hereinafter described is provided for limiting the rotational movement of the valve in such a manner that in different positions of adjustment of the limiting means more or less of the upper edge 32, 33, 34 of the chamber opening will be disposed in registration with the inlet port 11 of the housing 10. These different positions of adjustment are illustrated somewhat diagrammatically in Fig. 7 and it will be obvious from an inspection of the showing therein that in position A air will be trapped in the chamber above the portion 34 of the edge opening. In other words, the capacity of the chamber and quantity of liquid therein will be relatively small. In position B the air chamber will be smaller and the quantity of liquid larger. In position C the maximum capacity of the chamber will be utilized, but even in this position air will be trapped above the liquid.

These various adjustments of the "throw" of the valve are obtained by means of the structure illustrated particularly in Fig. 3. The upper wall or top of the valve has secured thereto and extending upwardly therefrom a plurality of studs or pins 35 which are adapted to register with a corresponding number of holes or openings 36 in a disk 37 which is removably mounted on the top of the valve. The disk has a central opening 38 which receives the valve spindle or shaft 39. The disk 37 has extending outwardly therefrom a plurality of lugs 40, 41 and 42 which are unequally spaced apart and are unequal in width. These lugs coact with a stop pin 43 carried by the housing 10 and projecting therethrough into the path of movement of the lugs and to a position above the top of the valve, as shown in Fig. 2.

When the plate 37 is positioned as shown in Fig. 3 the valve is permitted to move through the angle X or between the adjacent edges of lugs 40 and 41. This adjustment will give maximum capacity for the measuring chambers. If a smaller capacity is desired the disk 37 is lifted from the pins 35 and is moved to position the stop pin 43 between the adjacent surfaces of lugs 40 and 41 or 41 and 42. When the pin 43 is positioned between adjacent surfaces of the lugs 40 and 41 a minimum throw of the valve is permitted and a minimum capacity will be obtained. When the pin is positioned between lugs 41 and 42 the capacity will be intermediate the minimum and maximum.

The disk 37 is retained in position on the top of the valve by a spring 45 which rests on the disk and is positioned between a cover plate 46 for the valve housing and the disk. In the form of the invention shown the cover 46 is threaded into the top of the housing. A spindle 39 extends upwardly through the cover and has attached to the upper end thereof a handle 47.

In order to disassemble the valve the handle 47 is removed from the spindle, the cover plate 46 is then removed from the housing and the valve can be lifted from the housing.

In this embodiment of the invention the valve 10 is rotated through a relatively small angle from filling to discharge position and it will be evident from the foregoing description that when one of the chambers, as 21 in Fig. 5, is in filling position the other chamber 22 will be disposed in discharge position. After the chamber 22 is discharged the valve is rotated in a clockwise direction viewing Fig. 5 to position the chamber 21 in discharge position and to position the chamber 22 in filling position. Thus, whenever one of the chambers is being discharged the other chamber is being filled.

Figs. 8 and 9 show a slightly modified form of housing and valve construction. In this modification the housing 50 is provided with oppositely disposed inlet and outlet ports, the inlet port being indicated at 51 and the outlet port at 52. The valve chamber openings are, in this form of the invention, wider, as illustrated in Figs. 8 and 9, so that when one opening communicates with the inlet port 51 the other opening will communicate with the oppositely disposed outlet port 52. Fig. 9 illustrates the shape of the chamber opening 53. This form of construction operates in the same manner as that above described and accomplishes the same object in that one chamber is always disposed in filling position when the other chamber is disposed in discharge position.

From the foregoing description it will be clear that a simple, practical and efficient measuring device has been designed and that by providing a plurality of chambers in the valve and properly locating the chambers with reference to the inlet and discharge ports of the housing a more efficient valve construction has been obtained since one chamber will be filling whenever another or the other chamber is emptying. Therefore, a single movement of the valve in one direction is necessary to dispense a measured charge of liquid.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. A liquid measuring and dispensing device comprising a housing having an inlet and a discharge port, a valve in said housing having a plurality of chambers therein, each chamber having an opening arranged in one position of the valve to communicate with the inlet port and in another position to communicate with the outlet port, the upper edge of each chamber opening being irregular and arranged to register with the housing inlet opening to variable extents, depending upon the position of movement of the valve, said chambers and ports being so relatively constructed and arranged that one chamber will communicate with the discharge port when the other is in communication with the inlet port, and adjustable means for varying the amount of registration between the housing inlet port and chamber openings.

2. A liquid measuring and dispensing device comprising a housing having an inlet and a discharge port, a rotary valve in said housing having a plurality of chambers therein, each chamber having an opening arranged in one position of the valve to communicate with the inlet port and in another position to communicate with the outlet port, the upper edge of each chamber opening being irregular and arranged to register with the housing inlet opening to variable extents, depending upon the position of movement of the valve, said chambers and ports being so relatively constructed and arranged that one chamber will communicate with the discharge port when the other is in communication with the inlet port, and adjustable means for varying the amount of rotation of the valve and the amount of registration between the housing inlet port and chamber openings.

3. A liquid measuring and dispensing device comprising a housing having an inlet and a discharge port, a valve in said housing having a plurality of chambers therein, each chamber having an opening arranged in one position of the valve to communicate with the inlet port and in another position to communicate with the outlet port, the upper end of each opening being inclined and disposed below the upper wall of the chamber whereby air will be trapped in the chamber above the liquid, and adjustable means for varying the registration of the upper edge of the said opening with the inlet port of the casing or housing.

4. A liquid measuring and dispensing device comprising a housing having an inlet port and an outlet port, a valve movably mounted in the housing and having a pair of chambers therein, each chamber having an opening adapted to communicate with the inlet port in one position of the valve and to communicate with the outlet port in another position of the valve, the upper edge of said valve chamber opening being inclined and disposed below the upper edge of the housing inlet port said valve being movable alternately in opposite directions through a path of movement so determined that when one chamber opening communicates with the inlet port, the other chamber opening will communicate with the outlet port, and adjustable means to vary the extent of movement of the valve and thereby vary the amount of registration between each chamber opening and the inlet port.

5. A liquid measuring and dispensing device comprising a housing, a rotatable valve in said housing, an inlet port and an outlet port in said housing, a pair of chambers in said valve, each chamber having an opening through which the chamber can be filled and discharged, a pair of pockets in said housing communicating with the outlet port, said pockets being equally spaced from the inlet port, a distance equal to the distance between the valve openings whereby one chamber opening can register with one of the pockets and communicate with the outlet port when the other chamber opening registers with the inlet port.

6. A liquid measuring and dispensing device comprising a housing, a rotatable valve in said housing, an inlet port and an outlet port in said housing, a pair of chambers in said valve, each chamber having an opening through which the chamber can be filled and discharged, a pair of pockets in said housing communicating with the outlet port, said pockets being spaced equal angular distances from the inlet port, and a distance equal to the distance between the valve openings whereby one chamber opening can register with one of the pockets and communicate with the outlet port when the other chamber opening registers with the inlet port.

7. A liquid measuring and dispensing device comprising a housing having inlet and outlet ports, a rotatable valve in said housing having a chamber provided with an opening adapted to register, in different positions of rotation, with said inlet and outlet ports, the upper edge of said chamber opening being inclined and arranged to register to variable extents with the housing inlet opening, depending on the movement of the valve, a member detachably carried by the valve and movable therewith, said member having lugs projecting therefrom spaced apart unequal angular distances, and a stop carried by the housing and arranged to coact with pairs of said lugs to limit the rotatable movement of said valve.

8. A liquid measuring and dispensing device comprising a housing having inlet and outlet ports, a rotatable valve in said housing having a chamber provided with an opening adapted to register, in different positions of rotation, with said inlet and outlet ports, the upper edge of said chamber opening being inclined and arranged to register to variable extents with the housing inlet opening, depending on the movement of the valve, a member detachably carried by the valve and movable therewith, coacting means on said member and said valve for holding said member in a plurality of positions of angular adjustment thereon, said member having lugs projecting therefrom spaced apart unequal angular distances, and a stop carried by the housing and arranged to coact with pairs of said lugs to limit the rotatable movement of said valve.

9. A liquid measuring and dispensing device comprising a housing having inlet and outlet ports, a pair of pockets in said housing disposed at equal angular distances from and on opposite sides of said inlet port, said pockets communicating with said outlet port, a valve having a pair of chambers therein, each chamber having an opening adapted to register successively with the inlet port and with one of said pockets, the chamber openings being spaced apart angularly a distance equal to the angular distance between the inlet port and each pocket.

10. A liquid measuring and dispensing device comprising a housing having an inlet and an outlet port, said housing having the bottom thereof recessed to provide conduits communicating with the outlet port, a rotatable valve in said housing having a pair of chambers, each chamber having an opening through which the chamber is filled and discharged, the chambers being so arranged that one chamber will communicate with the housing inlet port when the other communicates with the outlet port, the bottom of the valve having a projection adapted to extend into the recess in the bottom of the housing, thus insuring the proper assembling of the valve in the housing.

SAUL BLICKMAN.